No. 792,290.

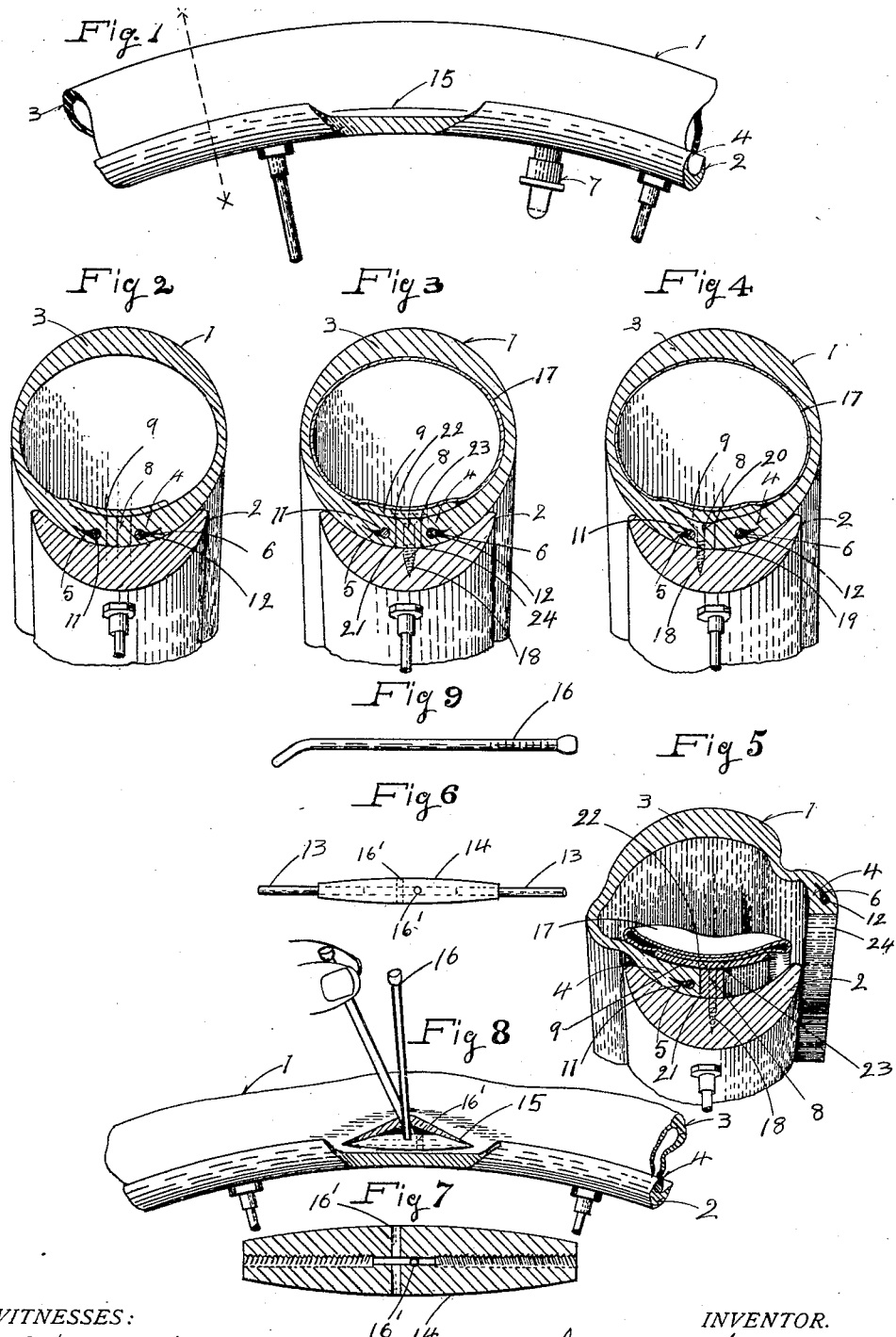

Patented June 13, 1905.

UNITED STATES PATENT OFFICE.

CORYDON S. SEARS, OF TOLEDO, OHIO.

PNEUMATIC TIRE.

SPECIFICATION forming part of Letters Patent No. 792,290, dated June 13, 1905.

Application filed September 22, 1904. Serial No. 225,406.

*To all whom it may concern:*

Be it known that I, CORYDON S. SEARS, a citizen of the United States, residing at Toledo, in the county of Lucas and State of Ohio, have invented a new and useful Improvement in Pneumatic Tires, of which the following is a specification.

My invention relates to pneumatic tires for vehicle-wheels, and has for its object to provide a single-tube tire of the kind that is adapted to be readily and securely attached by constriction before inflation to concave rims commonly used in such manner and by such means that the tire cannot become loose and "creep" on the rim and that is not dependent on inflation for tightening it or cement for securing it on the rim.

A further object is to provide a tire of the kind described that is adapted when desired to be readily converted into a convenient casing for an inner inflation-tube by slitting the base of the tube circumferentially of the rim and that when so converted into an outer casing and secured to the rim may have either half of its base readily released from the rim, while the other half remains attached thereto, for the convenient removal or insertion of the inner tube, or that may be so converted as that one-half only of the base is adapted to be released from the rim for the removal or insertion of the inner tube.

I accomplish these objects by constructing a tire as hereinafter described, and illustrated in the drawings, in which—

Figure 1 is a side elevation of a broken-off section of a wheel-rim equipped with my tire with the tire inflated. Fig. 2 is a cross-section on line X X of Fig. 1, showing the tire in the form of a single tube with the tube inflated. Fig. 3 is a similar view showing my tire converted into one form of casing for an inner tube with the inner tube inflated. Fig. 4 is a similar view showing another slightly-modified form of casing formed by converting a single tube and inclosing an inflated inner tube. Fig. 5 is a similar view showing one side of the base of the casing as shown in Fig. 3 opened for either the removal or the insertion of the inner inflation-tube. Fig. 6 shows the form of the elongated capstan-nut by which the wire rings are constricted or loosened on the rim. Fig. 7 is an enlarged longitudinal section of the same. Fig. 8 is a side elevation of a section of my tire similar to that shown in Fig. 1 with the tire uninflated and showing manner of and means for tightening or loosening the wires of the tire, whether as a casing or as a single tube. Fig. 9 shows form of capstan nut-lever.

In the drawings, in which the same parts are indicated by the same numerals, 1 represents the tire, and 2 the rim upon which the tire is mounted, the rim being of the ordinary concave variety commonly used.

3 represents the inwardly-thickened tread portion of the tire, and 4 the similarly-thickened base portion which engages the rim 2.

5 and 6 represent annular cavities parallel around and in the base of the tire and on opposite sides of the valve-stem 7, which extends through the intervening portion 8 of the base of the tire.

9 represents a flap which is connected to the inner wall of the tire along one side and extends over the inner face of the base toward the opposite side, but disconnected therefrom, and 11 and 12 represent wire rings that are respectively incased in the annular cavities 5 and 6. The rings 11 and 12 are each formed of a wire 13, having its opposite ends respectively right and left threaded to be engaged by the elongated capstan coupling-nut 14, having its opposite end portions right and left threaded to engage correspondingly-threaded end portions of the wire and adapted to be simultaneously run on each by turning in one direction and to be run off the same when turned in the opposite direction, thereby forming a ring which may be circumferentially contracted or expanded. Before the tire is placed on the rim the wires 13 are inserted into the cavities 5 and 6 through incisions 15, which extend through the outer face of the base portion of the tire, as shown in Figs. 1 and 8, one into each annular cavity below the level of the upper side portions of the rim, so that when the tire is seated in the rim and inflated the incisions 15 are hidden by the rim, but when uninflated may be exposed and opened by a suitable tool, as shown in Fig. 8. The wires 13 are each of a length to extend around the base of the tire from opposite ends of the incisions 15, and after being so inserted the coupling-nut 14 for each wire is run thereon a short distance. While the rings are of sufficient diameter to pass over the edges of the rim, the tire is placed thereon, and the incisions being opened while the tire is uninflated, as shown in Fig. 8, the nut 14 of each ring, which is provided with the diametric bores 16' for the purpose, is turned with a suitable capstan-lever 16 until each of the rings 11 and 12 are drawn tightly around the concave face of the rim. By locating the cavities 5 and 6 nearer the outer than the inner surface of the base portion and increasing the thickness of the base portion, especially the portion 8 between the cavities, the rings may be drawn thus tightly around the rim without the rings being crowded toward the center of the rim, the central portion 8 of the base having sufficient resistance to prevent such inward crowding. The nuts 14 are elongated and tapered toward each end, and underneath each nut the rim is provided with a shallow cavity suited to the size and shape of the nut, in which the nut lies, and which is of such depth that the wire of each ring when tightened on the rim lies close thereto around its entire circumference, being only separated therefrom by a portion of the wall of the base. When thus secured and the tire is inflated, the tire cannot become loose and creep or turn in the rim, and no cement is required for attaching the tire to the rim.

A tire thus constructed is more resilient by reason of the fact that the pressure of inflation is not required to increase the grip of the tire on the rim and that the air-pressure therein may be adjusted to the desired resilience. It is also less liable to puncture by reason of such greater resilience and to "blow out" by reason of the reduced pressure.

A single-tube tire thus constructed is readily adapted to be converted into a convenient reliable casing for an inner inflation-tube by simply dividing the base of the tube entirely around the rim on the central dotted line shown in Fig. 2. When thus divided, the casing, with an inner tube 17 inclosed therein around and outside the flap 9, may be secured on the rim before the inner tube is inflated, in like manner as described for a single tube. It is preferred, however, when converted into this form of casing after partially tightening the ring 11 and before inserting the inner tube to provide the half of the central portion 8 of the base at intervals between the spokes with screws 18, (or other like means of fastening,) which are run or driven through the half portion 8 into the rim, with the shoulder 19 (formed by dividing the base) coinciding with a central circumferential line of the rim. Thus secured the inner tube may be inserted as described, and the other half of the base may be contracted into its normal position, with the shoulder 20 (also formed by the division of the base) abutting the shoulder 19, by tightening the ring 12 around the rim in the manner already described. The ring 11 being fully tightened on the rim, the inner tube may be inflated, as shown in Fig. 4. When so inflated, the flap 9 forms a covering for any interstice there may be between the shoulders 19 and 20 and prevents portions of the inner tube from being forced by the pressure therein into such interstices, if there should be any, by reason of imperfectly tightening the rings or by reason of their being drawn apart by the pressure.

In Fig. 3 is shown a single-tube tire constructed in accordance with my invention converted into a casing by dividing the base longitudinally around the rim, as indicated by the outer dotted lines of Fig. 2, and separating from the base the annular portion 8 and forming on opposite sides of the respective planes of division the shoulders 21 and 22 and 23 and 24. The flap 9 is also severed from the body of the tire 1 near its connection therewith. The annular base portion 8 is then first secured central around the rim, with the severed flap 9 around the portion 8, by screws 18 or other suitable fastenings run central therethrough at intervals and into the rim, as shown in Fig. 3, and in the manner already described the casing, with the uninflated inner tube 17 inclosed therein, may be secured on the rim by constricting the rings 11 and 12 thereon, and the inner tube being inflated, as shown in Fig. 3, the shoulders 22 and 23 of the central portion 8 form secure abutments for the shoulders 21 and 24, respectively, of the casing and prevent any inward crowding of the rings further than to tighten the shoulders under the flap 9 as the rings are tightened on the rim. The central portion 8 thus secured also prevents any liability of turning of the casing and insures its being properly centered on the rim. In this form it is manifest that either ring 11 or 12 may be loosened, as shown in Fig. 5, for either removing or inserting the inner tube.

To avoid any liability of injury to the sides of the tire, commonly called "rim-cutting," which occurs with tires from the lack of proper inflation, whereby the sides are pressed down over the edges of the rim, these edges are preferably slightly rounded outward by a reverse curve, as shown in Figs. 2, 3, 4, &c. This may be done without injury to the rim and, as my tire is secured, without lessening the security of the tire on the rim.

From the foregoing it will be seen that I have produced a single-tube tire that is adapted to be secured by positive means included within itself to the concave rims in common use and that is also adapted to be converted by division or incision of its base into a convenient casing for an inner tube.

By constructing a tire in accordance with my invention no special form of rim is required, and it may be readily secured not only to the concave rims in common use, but to special forms of rims required for some of the special forms of tires used. It is not dependent on inflation for increasing its hold upon the rim nor upon the use of cements or other extraneous means of attachment to the rim. Its manner and means of attachment wholly prevent "creeping" on the rim and the consequent breaking of the valve-stem whatever may be the condition of the tire as to inflation. It is not subject to the enlargement of the rim-base from use, as is common with many tires, its form of construction and means of attachment permitting the rim-base to be made of such diameter that the two will pass freely over the rim without stretching when the wire rings are partly expanded. By reason of my tire not requiring excessive inflation for security on the rim it permits of the tread being thickened without affecting its resilience, and thereby reduces its liability to puncture.

What I claim to be new is—

1. In a pneumatic tire for vehicle-wheels, an annular flexible tube having an inwardly-thickened rim-base and an inner flap integral with one side of and extending over, and around the base, a valve-stem extending central through and radial to the rim-base, annular cavities in the rim-base extending parallel around the base, one on each side the valve-stem, wire rings in the annular cavities, and means to reduce or enlarge the circles of the rings.

2. The combination with a vehicle wheel-rim, having a concave outer face, of an annular flexible and collapsible tube, said tube having an inner diameter when collapsed greater than the outer diameter of the rim and an inwardly-thickened rim-base provided with an inner covering-flap integral with one side and extending over and around the base, annular cavities in the rim-base extending parallel around and on opposite sides of an intervening annular central portion of the base; an incision through the outer wall of the base into each cavity, a wire adapted to be inserted in each cavity through the incisions and to extend around the base, said wires having right and left threaded end portions adjacent to the incisions, an elongated capstan-nut for each wire adapted to engage the threaded end portions and couple the wire ends, and to be engaged through the incisions and turned to contract or expand the rings thus formed.

In testimony whereof I have signed my name to this specification, in the presence of two subscribing witnesses, this 19th day of September, 1904.

CORYDON S. SEARS.

Witnesses:
  V. W. MOREHOUSE,
  GRACE COWDRICK.